J. R. SANBORN.
METHOD OF PRODUCING MICA INSULATION.
APPLICATION FILED AUG. 10, 1910.
1,138,691.
Patented May 11, 1915.
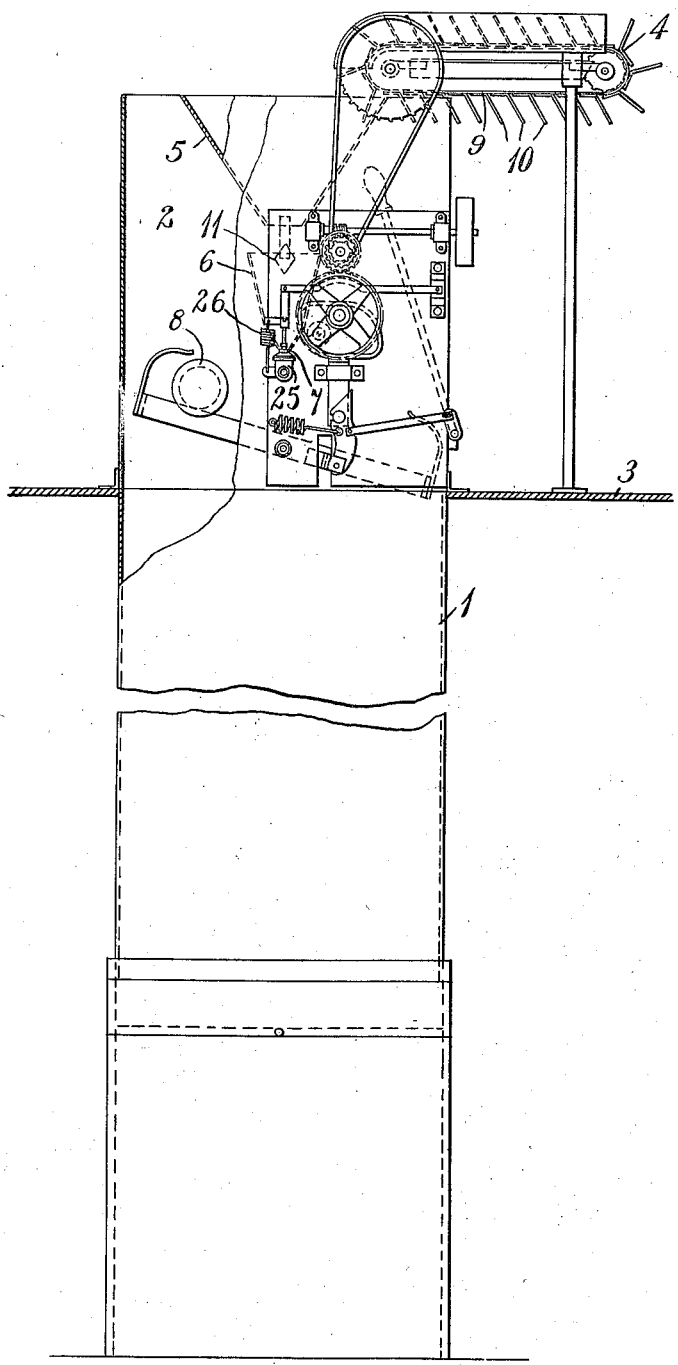
WITNESSES:
Fred H. Miller
R. J. Sanborn
INVENTOR
John R. Sanborn
BY
Tinley G. Carr
ATTORNEY

UNITED STATES PATENT OFFICE.

JOHN R. SANBORN, OF PITTSBURGH, PENNSYLVANIA, ASSIGNOR TO WESTINGHOUSE ELECTRIC AND MANUFACTURING COMPANY, A CORPORATION OF PENNSYLVANIA.

METHOD OF PRODUCING MICA INSULATION.

1,138,691.     Specification of Letters Patent.     Patented May 11, 1915.

Application filed August 10, 1910. Serial No. 576,579.

*To all whom it may concern:*

Be it known that I, JOHN R. SANBORN, a citizen of the United States, and a resident of Pittsburgh, in the county of Allegheny and State of Pennsylvania, have invented a new and useful Improvement in Methods of Producing Mica Insulation, of which the following is a specification.

My invention relates to composite sheet insulation and it has for its object to provide a particularly simple and advantageous method of producing the same.

Sheet insulation has usually been produced by placing a layer of mica flakes on a thin sheet of paper, or other suitable material, which was first coated with shellac, or some other binder, in liquid form, to which the flakes would adhere, and then applying successive layers of shellac and mica flakes until a sheet of the desired thickness was formed, the sheet being then baked, under pressure, to produce a solid product of substantially uniform thickness. In order to render the insulation capable of withstanding relatively high voltages, the mica flakes of adjacent layers were carefully overlapped.

According to my present invention, I provide a particularly simple method which lends itself readily for use with automatic mica-building machines and avoids the difficulties which have usually rendered machines of this character impracticable. Instead of applying liquid shellac and placing the mica flakes in position, one by one, I sift an insulating binder, in the form of dry powder, between layers of mica flakes, which are distributed by ejecting the proper quantity from a hopper at a considerable height above the templet or base on which the sheets are to be formed. By this means, the mica flakes are thoroughly separated in the distributer and it is only necessary to use sufficient care, in removing the assembled insulating structure to the heated presses, to avoid relative displacement of the flakes. When the plates are subject to considerable pressure, at relatively high temperatures, the powdered binder is melted and forms a complete coating between layers, so that, when the insulation finally solidifies, it is uniform in thickness and solid in structure.

The single figure of the accompanying drawings is a partially sectional elevation of a mica-building machine which is adapted for automatically practising my invention.

Referring to the drawings, the structure here shown comprises a tower 1, having a top member 2 which is preferably located above the floor line 3 of a balcony or platform and comprises a conveyer 4, a receiving hopper 5, a distributing hopper 6, an ejector 7, a cylindrical sieve or bond distributer 8 and suitable operating mechanism therefor. The conveyer 4 comprises a continuous belt or chain 9 having a plurality of pockets or buckets 10, to which measured quantities of mica flakes may be supplied. The arrangement of parts is such that the mica in the pockets is successively emptied into the receiving hopper 5.

A deflector 11 is preferably provided in the mouth of the hopper 6 in order that the mica flakes may not be forced back into the hopper 5 when they are ejected from the hopper 6. The dry bond distributer 8 comprises a cylindrical sieve which extends completely across the tower and is supported, in any suitable manner, at its ends, so that it may be rolled backwardly and forwardly across the tower at right angles to its axis.

The ejector is provided with a valve 25 which is normally closed by a spring 26 and is intermittently opened, by any suitable means, whenever it is desired to discharge mica flakes from the hopper 6. Since the structure of the machine itself is described in detail and is claimed in my Patent No. 1,074,576, granted September 30, 1913 and assigned to Westinghouse Electric and Manufacturing Company, I deem it unnecessary to include a detailed description thereof herein. In fact, the mechanism illustrated constitutes only one suitable means for practising my invention, and other means which may be more or less automatic in their action will readily suggest themselves to those skilled in the art. It will be further understood that my invention is not limited to the utilization of the specific insulating materials which are hereinbefore mentioned.

I claim as my invention:

1. The method of manufacturing sheet insulation which consists in scattering mica flakes and powdered insulating bond into the upper portion of a laterally restricted and vertically elongated space, permitting said material to be deposited within said space and subjecting the deposited mixture to heat and pressure.

2. The method of manufacturing insulating sheets or plates, which consists in projecting predetermined quantities of mica flakes and powdered insulating bond into the upper portion of a laterally restricted and vertically elongated air-filled chamber until a mass of mixed flakes and bond is deposited upon the floor of said chamber and then subjecting the deposited mixture to heat and pressure.

In testimony whereof, I have hereunto subscribed my name this 20th day of July, 1910.

JOHN R. SANBORN.

Witnesses:
R. J. DEARBORN,
B. B. HINES.